United States Patent
Aichele et al.

(10) Patent No.: US 6,253,411 B1
(45) Date of Patent: Jul. 3, 2001

(54) SUPPORTING ELEMENT FOR A WIPER BLADE BELONGING TO A WINDSCREEN WIPER IN A MOTOR VEHICLE

(75) Inventors: Wilfried Aichele, Winnenden; Martin Kiefer, Oberkirch; Thomas Kotlarski, Buehlertal, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,366

(22) PCT Filed: Nov. 13, 1998

(86) PCT No.: PCT/DE98/03338

§ 371 Date: Sep. 17, 1999

§ 102(e) Date: Sep. 17, 1999

(87) PCT Pub. No.: WO99/48734

PCT Pub. Date: Sep. 30, 1999

(30) Foreign Application Priority Data

Mar. 26, 1998 (DE) .............................................. 198 13 230

(51) Int. Cl.[7] ....................................................... B60S 1/38
(52) U.S. Cl. .................. 15/250.43; 15/250.451; 29/897.2
(58) Field of Search ...................... 15/250.451, 250.452, 15/250.453, 250.454, 250.48, 250.43, 250.44, 250.361, 250.001, 245; 29/897.2

(56) References Cited

U.S. PATENT DOCUMENTS

| | | | |
|---|---|---|---|
| 3,192,551 | * 7/1965 | Appel | 15/250.43 |
| 3,925,844 | * 12/1975 | Cone | 15/250.44 |
| 4,063,328 | * 12/1977 | Arman | 15/250.43 |

FOREIGN PATENT DOCUMENTS

| | | |
|---|---|---|
| 525850 | * 2/1993 | (EP) . |
| 0 498 802 B1 | 12/1993 | (EP) . |

* cited by examiner

*Primary Examiner*—Gary K. Graham
(74) *Attorney, Agent, or Firm*—Michael J. Striker

(57) ABSTRACT

The proposed support element (12) for a wiper strip (15) of rubber-elastic material belonging to a wiper blade (10) for motor vehicle windshields is fastened to the underside (22) of the elongated springing-elastic support element (12) facing the windshield so as to be parallel to the longitudinal axis, wherein this support element (12) is produced through the use of woven fiber material that is impregnated with a reaction mixture. A particularly simple and economical production of the support element (12) is possible when this support element (12) is produced entirely from the fiber material impregnated with the reaction mixture.

12 Claims, 4 Drawing Sheets

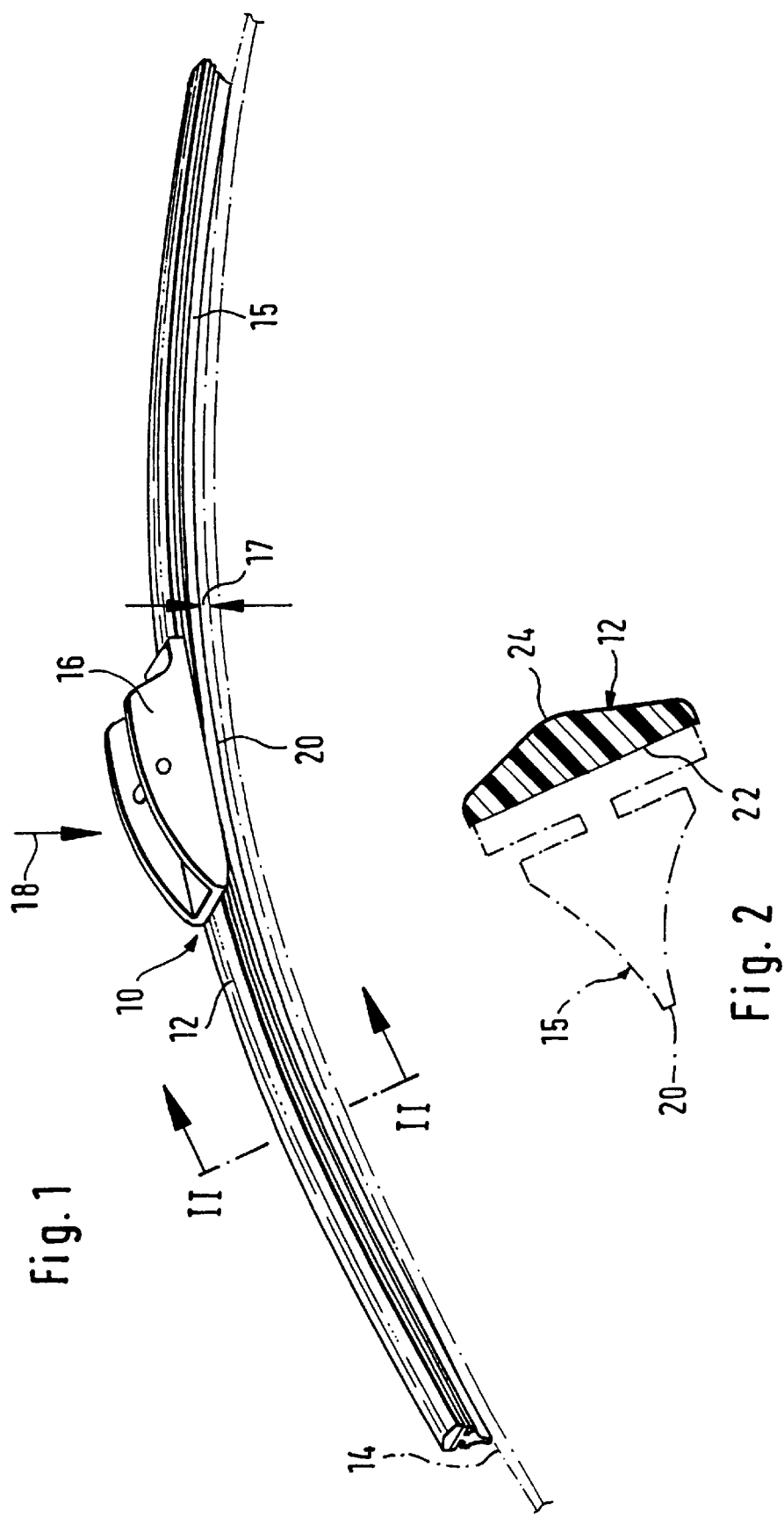

SUPPORTING ELEMENT FOR A WIPER BLADE BELONGING TO A WINDSCREEN WIPER IN A MOTOR VEHICLE

BACKGROUND OF THE INVENTION

The present invention relates to a support element for a wiper strip which is a part of a wiper blade for windshields of motor vehicles, and a method for producing it.

Support elements of this type should ensure that the force with which the wiper arm connected with the support element is pressed against the windshield is distributed as uniformly as possible. Due to a corresponding curvature of the support element when not under load—that is, when the wiper blade rests against the windshield—the ends of the wiper strip which rests in its entirety against the windshield during operation of the wiper blade are loaded toward the windshield by the support element which is tensioned in this case, even though the radii of curvature of spherically curved vehicle windshields changes with every position of the wiper blade. The curvature of the support element, and therefore the curvature of the wiper blade, must accordingly be somewhat greater that the greatest curvature measured in the wiping field of the windshield to be wiped. The support element therefore replaces the complicated support clip construction with two spring rails which are arranged in the wiper strip according to practice in conventional wiper blades.

A known support element of this type (EP 0 498 802 B1) has an elongated core piece which is rectangular in cross section and made of wood, foamed material, or the like, so that the transverse forces acting on the wiper blade during the wiping operation can be absorbed without disadvantageous deformation of the wiper blade. It is relatively complicated to produce the support element and, therefore, the wiper blade because the core piece must be packed all around by nonwoven or formed fabric strips.

SUMMARY OF THE INVENTION

It is therefore an object of the present invention to provide a support element and a method of producing the same, which eliminates the disadvantages of the prior art.

In keeping with these objects, one feature of present invention resides, briefly stated, in a support element in which the support element is produced entirely from the fiber material impregnated with the reaction mixture.

In the wiper blade according to the invention production of the support element is substantially simplified so that the wiper blade is considerably reduced in price.

The support element is well adapted to the respective requirements for the wiper blade when the support element is formed of a plurality of fiber material strips that are arranged in layers one on top of the other.

The tensile and compressive stresses occurring in the support element when it passes over spherically curved windshields are absorbed particularly well when the fiber material strips have fibers predominantly oriented in the longitudinal extension of the strips.

Transverse forces, torques and compressive stresses that occur have no effect on the wiping quality particularly when determined fiber material strips have predominantly fibers which enclose an angle of less than 90° with the longitudinal extension of the strip.

Since tensile stresses occur predominantly at the underside of the support element facing the windshield, at least the first fiber material strip layer has fibers oriented predominantly in the longitudinal extension of the strip proceeding from the underside of the support element facing the wiper strip. In certain applications, it may be advantageous when a plurality of fiber material strip layers with fibers which are oriented predominantly in the longitudinal extension of the strips are layered one upon the other at this underside of the support element.

Transverse forces, torques and compressive stresses occur repeatedly on the upper side of the support element remote of the windshield, so that layers of fiber material strip whose fibers predominantly enclose an angle of less than 90° with the longitudinal extension of the strips are advantageously arranged in the area of this upper side.

In a first embodiment form of the invention, the fiber materials strips at the underside of the support element are longer than the fiber material strips which lie on top and which decrease in length from layer to layer, so that there results a stable center part of the support element to which can be fastened a connection device for a wiper arm guiding the wiper blade. Further, this can also result in advantages for motor vehicle windshields with a particularly large curvature.

These advantages can also be achieved when the fiber material strips are broader in their longitudinal center portion than in their end portions.

A particularly economical production of the support element and, therefore, the wiper blade results according to a further embodiment form of the invention in which the fiber material strips at the underside of the support element are broader than the fiber material strips located above them which become narrower from one layer to the next. In a construction of this kind, the support element can be formed by joining endless fiber material strips of different widths. After the subsequent pressing process, the support element, which is now shaped, can be severed from the strand in a cutting station.

The requirements for the support element are met in a particularly advantageous manner when a thermosetting resin is selected as reaction mixture for impregnating the fiber material strips.

Certain fillers which change the characteristics of the support element in the desired manner can be added to this reaction mixture corresponding to the requirements demanded of the support element.

According to a process for producing a support element, a plurality of endless fiber material strips are joined, impregnated with a reaction mixture and then guided through a nozzle, wherein the multi-layered impregnated fiber material strand formed in this way is then wound with additional fiber material strips in a carousel installation and fed through another nozzle to a hot press station in which the fiber material strand is bent in its longitudinal direction and shaped in cross section, cured and then cut to the length required for the support element. A support element produced by this process can be produced in automatic installations with practically no labor costs. It is clear that costs can be further reduced in this way. Moreover, with appropriate control of the revolving speeds and/or strand forward-feed speed, the carousel installation can produce the support element in accordance with requirements, that is, for example, so that the fiber orientation at the end portions extends at a steeper inclination relative to the longitudinal axis of the support element than in the middle area of the support element.

Further advantageous developments with arrangements of the invention are indicated in the following description of an embodiment example of the support element shown in the drawing and of a production process for the support element.

BRIEF DESCRIPTION OF THE DRAWINGS

In the drawing,

FIG. 1 shows a perspective view of a wiper blade with a support element according to the invention;

FIG. 2 shows a section through the support element according to FIG. 1 along line II—II with a wiper strip indicated in dash-dot lines;

DESCRIPTION OF THE PREFERRED EMBODIMENTS

Figure 3:
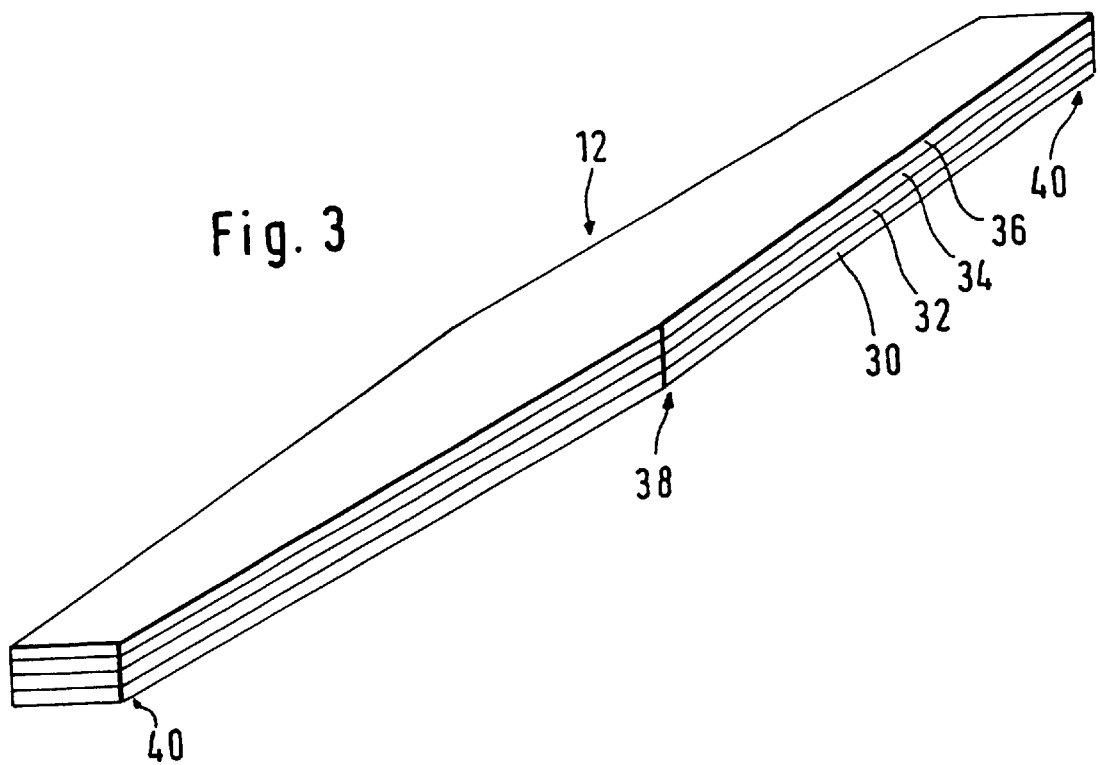
FIG. 3 shows a perspective schematic view of the construction of a support element, not to scale.
Figure 4:
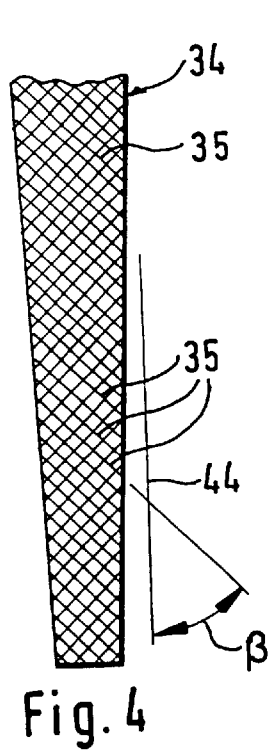
FIG. 4 shows the predominant fiber orientation of a determined fiber material strip.
Figure 5:
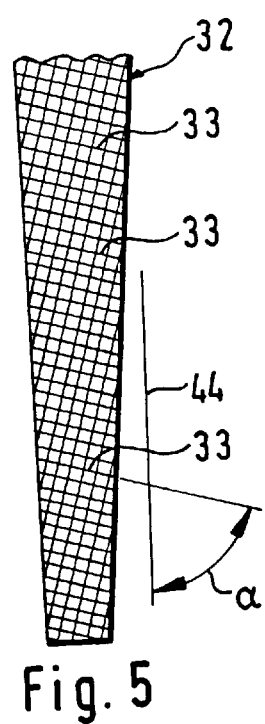
FIG. 5 shows the fiber orientation of another fiber material strip.
Figure 6:
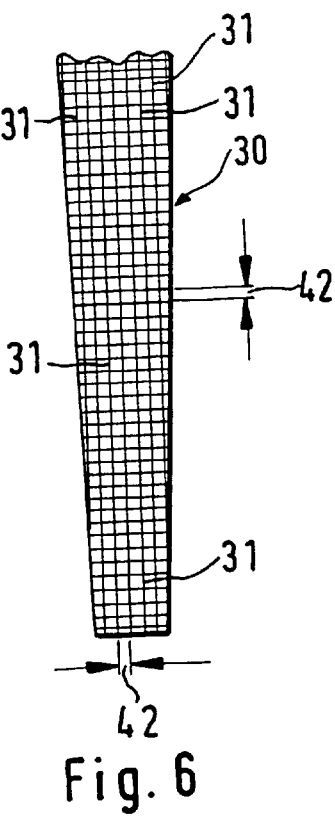
FIG. 6 shows the fiber orientation of another fiber material strip.

A wiper blade 10 shown in FIG. 1 has a strip-like elongated springing-elastic support element 12, wherein an elongated rubber-elastic wiper strip 15 is fastened to the underside of the support element 12 facing the windshield 14 to be wiped so as to be parallel to the longitudinal axis. A connection device 16 is arranged at the upper side of the support element 12. This support element 12 is also referred to as a spring rail. The wiper blade 10 can be connected with a driven wiper arm, not shown, in an articulated and detachable manner by means of this connection element 16. The wiper arm and accordingly also the wiper blade 10 are loaded toward the windshield 14 (arrow 18). The spherically curved windshield 14 is shown in dash-dot lines in FIG. 1. The curvature shown therein shows the greatest curvature of the windshield. It is clear from FIG. 1 that the curvature of the wiper blade 10 and support element 12 is greater than the maximum curvature of the windshield. This is made clear by the gap 17 remaining between the windshield 14 and the wiper strip 15 when the wiper blade is not loaded and contacts the windshield 14 only by the ends of its wiper strip 15. The wiper blade 10 contacts the surface of the windshield along its entire length by the wiper lip 20 of the wiper strip 15 under contact pressing pressure (arrow 18). In doing so, a tension builds up in the springing-elastic support element 12 which provides for proper contact of the wiper strip 15 and its wiper lip 20 against the windshield 14 along the entire length of the wiper strip. The support element 12 is produced from a plurality of layers of fiber material which is impregnated with a reaction mixture. This layer construction is not shown in FIG. 2. The basic construction of the support element can be seen from FIG. 3. As is shown in this Figure, a plurality of fiber material strips 30 to 36 are layered on top of one another. All strips are wider in their middle area 38 than at their end areas 40. The fiber material strips differ from one another with respect to the orientation of the fibers corresponding to the forces acting on the support element 12 during the wiping operation. Since predominantly alternating tensile stresses occur in the area of the underside 22 (FIG. 2) of the support element 12 facing the windshield 14 during the wiping operation—these tensile stresses can be seen in the constantly alternating radii of curvature of the windshield—it is recommended that a plurality of fiber material strips 30 are layered and that care is taken that the fibers 31 of the fiber material strips 30 are oriented predominantly in the longitudinal extension 44 of the strips. It is advantageous in this respect when the fiber spacing 42 is selected so as to correspond to the magnitude of the occurring load. With regard to the further construction of the support element, fiber material strips such as those shown in FIGS. 4 and 5 are used at the upper side 24 (FIG. 2) of the support element. In these fiber material strips 32 and 34, the fibers 33 and 35 are predominantly oriented in such a way that they enclose, respectively, an angle α and β of less than 90° with the longitudinal extension 44 of the strip. The normal stresses and shearing stresses acting on the support element during the wiping operation are absorbed particularly well by arranging the fibers in this manner. The fourth fiber material layer, designated by 36 in FIG. 3, can be selected from any of the fiber material strips 30 or 32 or 34 corresponding to requirements. It should be noted that the fiber material strip layers 30, 32, 34 and 36 need not be formed from an individual strip; rather, every fiber material strip can be formed by layering a plurality of identical individual strips. The quantity of layers can also differ from the number of layers shown in FIG. 3; naturally, this also applies to the layers shown in FIGS. 7 and 8.

Figure 7:
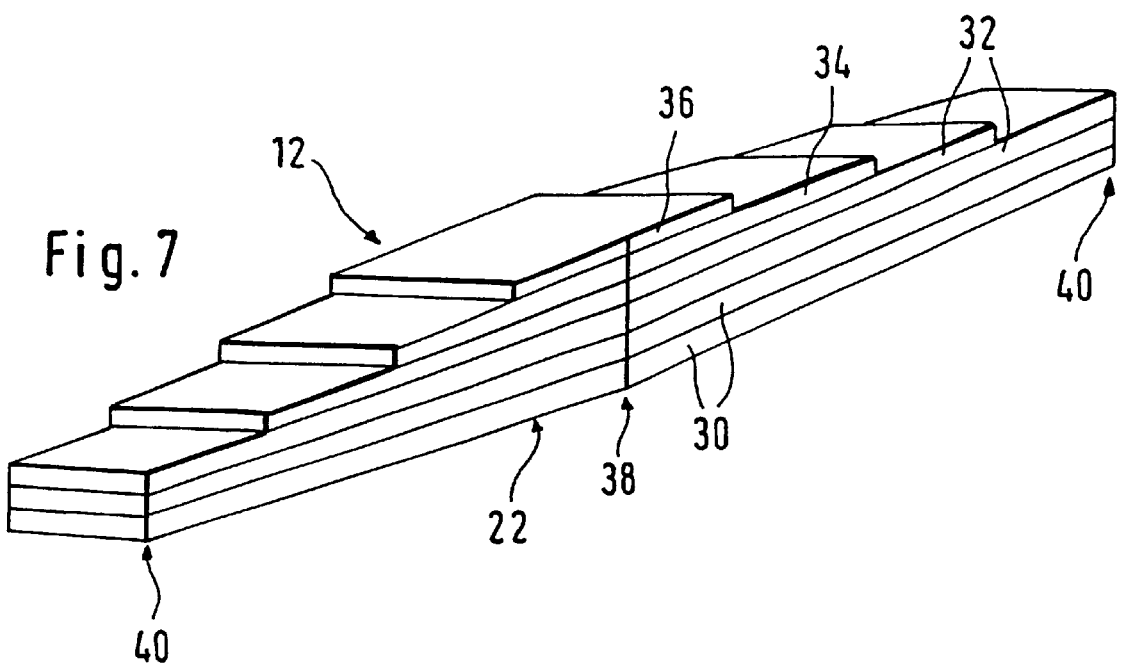
FIG. 7 shows a schematic view of a support element construction in perspective, not to scale.

FIG. 7 shows a somewhat more practical construction illustrating the principle of a first embodiment form of the support element. Consideration of the special arrangements of the fiber material strips or layers 30, 32 and 34 described above shows that the fiber material strips 30 are longer in the area of the underside 22 of the support element 12 than the fiber material strips lying on top which become shorter from layer 32 to layer 36. The support element is accordingly smaller and more elastic in thickness toward the ends, so that even relatively tight windshield radii can be cleaned properly. The arrangement of fiber material strips of different length is carried out in such a way that the longest fiber material strips, e.g., the fiber material strips designated by 30, are used in the area of the underside 22 of the support element. Further construction can be carried out in such a way that the shorter fiber material strips 32, 34, 36 are arranged so as to be centered on the fiber material strips 30. However, this is not mandatory. It is also possible to arrange the shorter layers eccentric to the fiber material strips 30 in the longitudinal direction. In this embodiment form also, the individual layers 30, 32, 34, 36 need not be formed by an individual fiber material strip, but, rather, a plurality of fiber material strips can also be used for this purpose. Further, it may be advantageous when the width of the fiber material strips becomes narrower proceeding from the underside 22 of the support element 12 toward the top 24 of the support element and/or from the middle area to the end areas.

Figure 8:
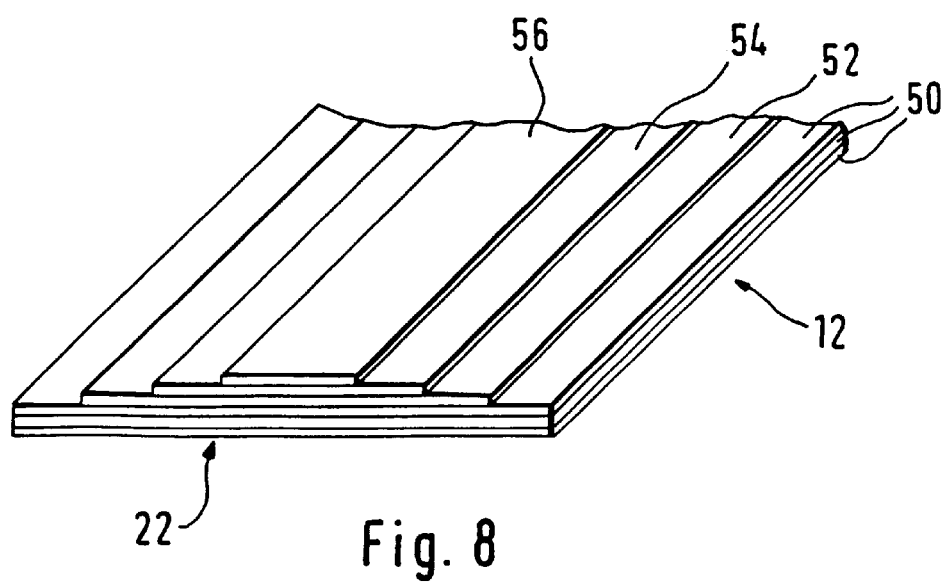
FIG. 8 shows a partial view of a support element having a different construction.

In another embodiment form which is shown in FIG. 8, the fiber material strips 50 to 56 at the underside 22 of the support element 12 are wider than the fiber material strips which are located on top and which become smaller from one layer the next. In this way, the individual fiber material strips can be joined so as to be endless in practice and can be cut to length in additional machining steps. With a layering of this kind, the somewhat more complicated construction of the support element with fiber material strips of different lengths is eliminated. In contrast to the view in FIG. 8, it is also possible to carry out the layering of the fiber material strips 50 to 56 in such a way that the longitudinal center axis of the fiber material strip 56 lies next to the longitudinal center axis of the fiber material strip 50. In this case also, a plurality of strips can be joined to form layers.

In order to impart the required strength to the support elements according to FIGS. 7 and 8, the fiber material strips 30 to 36 or 50 to 56 formed from individual fibers, e.g., by weaving or the like, are impregnated with a thermosetting resin reaction mixture before joining. In order to improve the characteristics of the reaction mixture with respect to the function to be performed by the support element, it may be advantageous to add fillers to this reaction mixture. Glass fibers, carbon fibers, mineral fibers, aramid fibers, et al., can be used as fiber material. Polyester resins, phenolic resins, epoxy resins, et al., are particularly suitable as a reaction mixture. In all of the embodiment examples the support element is produced entirely from the fiber material impregnated with the reaction mixture. When the layered strip packets or strip bands according to FIGS. 7 and 8 are compression-molded, the stepped construction is done away with, resulting in a support element with continuous outer contours. Compare FIGS. 1 and 2 in this regard.

Figure 9:
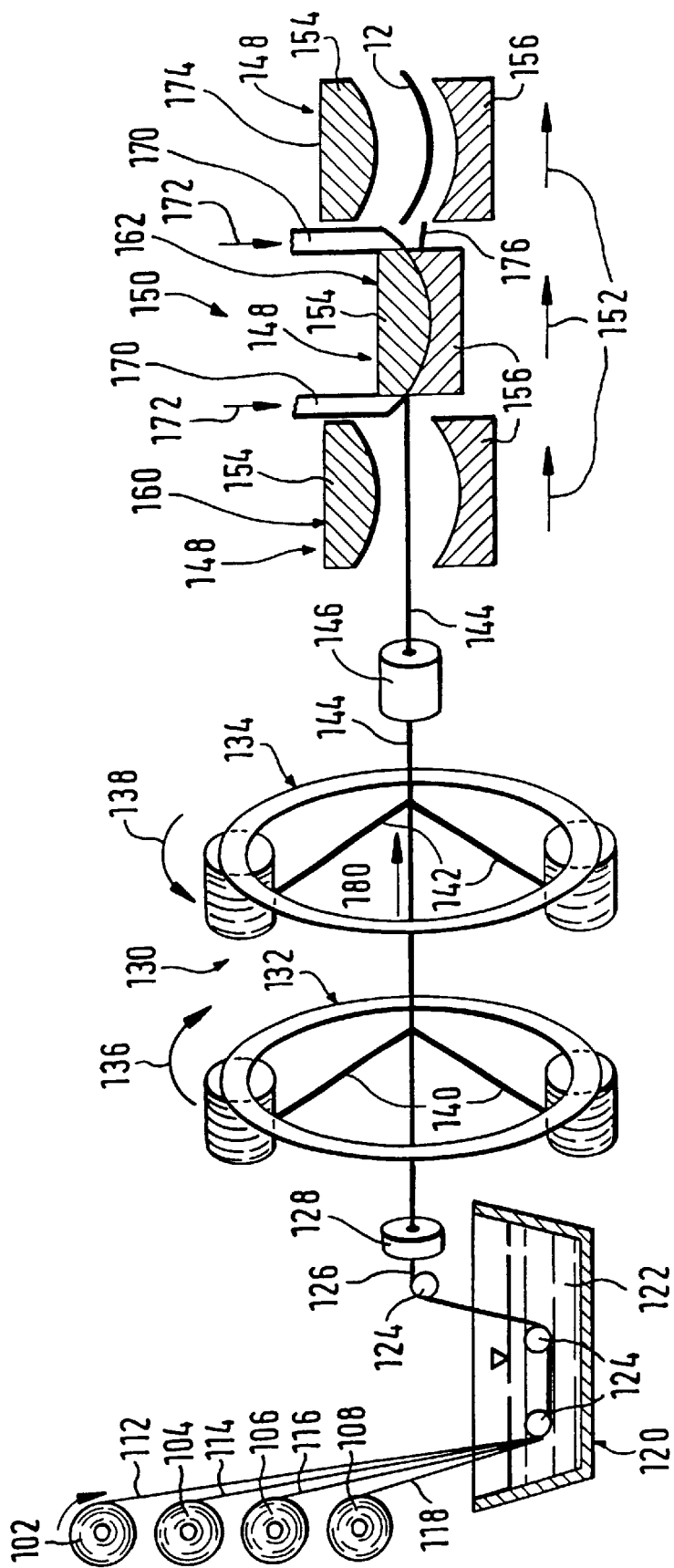
FIG. 9 shows a schematic view of the process steps for producing a support element according to the invention.

The principle of a production process for a support element, according to the invention, which is constructed in a different manner will be explained in the following with reference to FIG. 9. In this case, manufactured fiber material strips 112 to 118 which are endless in practice are wound off from supply rolls 102 to 108 and guided together through a bath 102 with reaction mixture 122. A plurality of deflecting rollers 124 are used for guiding. The output strand or core strand 126 formed in this way is guided through a first nozzle 128 at which the excess reaction mixture is stripped off and the strands 112 to 118 are pressed against one another so as to achieve a degree of adhesion of the core strand 126. The core strand 126 is then guided to a carrousel installation 130, as it is called, which has two winding devices 132, 134 in the embodiment example shown in the drawing. Each winding device 132 and 134 revolves in the direction of arrows 136 and 138, respectively, and applies additional strands 140 and 142 to the core strand 126, resulting in a finished strand 144 which exits the carrousel installation 130. This finished strand 144 passes through another nozzle 146 in which an intimate combination of the core strand 126 and additional strands 140, 142 is achieved. After exiting the nozzle 146, the finished strand 144 enters a hot press station 150 having a plurality of pressing molds 148 and travels in the direction of arrows 152 corresponding to the progress of the finished strand 144 coming from the nozzle 146. During this traveling movement 152, the halves 154, 156 of the different pressing molds 148 are opened (reference number 160), so that the finished strand 144 can enter this mold. In the course of this traveling movement (arrow 152), the pressing mold 148 is closed, and the finished strand 144 is bent in its longitudinal direction and is shaped in cross section (reference number 162). At the same time, the finished strand 144 which is now bent is cured to a certain extent and a cutting device cuts the bent finished strand 144 to the amount required for the support element 12 in that cutting knives 170 move in the direction of arrows 172. After the mold halves 154, 156 are opened (reference number 174), the finished pressed support element 12 can be removed. Shear cuttings 176, if any, exit the pressing station 150.

A manufacturing process of the kind described above is particularly economical and inexpensive. Further, by using a multiple-step carrousel installation 130, by changing the revolving speed of the individual carrousel stations and/or by changing the forward feed speed (arrow 180) of the core strand 126, the orientation of the fibers in the finished strand 144 or support element 12 can be influenced in such a way that different fiber orientation directions are formed in the areas of the support element 12 receiving different stresses.

What is claimed is:

1. Support element in combination with a wiper strip (15) of rubber-elastic material belonging to a wiper blade (10) for motor vehicle windshields, this wiper strip (15) being fastened to an underside (22) of an elongated spring-elastic support element (12) facing a windshield (14) so as to be parallel to a longitudinal axis, wherein this support element (12) is produced in an external area with woven fiber material that is impregnated with reaction mixture, and the support element (12) is produced entirely from the fiber material impregnated with the reaction mixture.

2. Support element according to claim 1, wherein the support element (12) is formed of a plurality of fiber material strips (30, 32, 34, 36) that are arranged in layers one on top of the other.

3. Support element according to claim 2, wherein the fiber material strips (30) have fibers (31) predominantly oriented in the longitudinal extension (44) of the strip.

4. Support element according to claim 2, wherein the fiber material strips (32 and 34, respectively) have predominantly fibers (33 and 35, respectively) enclosing an angle (α and β, respectively) of less than 90° with the longitudinal extension (44) of the strip.

5. Support element according to claim 2, wherein at least a first fiber material strip layer (30) has fibers (31) oriented predominantly in the longitudinal extension (44) of the strip proceeding from the underside (22) of the support element (12) facing the wiper strip (15).

6. Support element according to claim 5, wherein additional fiber material strip layers (32, 34, 36) whose fibers predominantly enclose an angle (α and β, respectively) of less than 90° with the longitudinal extension (44) of the strips are arranged on the side of the fiber material strip layer (30) remote of the underside (22).

7. Support element according to claim 2, wherein the fiber materials strips (30) at the underside (22) of the support element (12) are longer than the fiber material strips which lie on top and which decrease in length from layer (32) to layer (34, 36).

8. Support element according to claim 7, wherein the fiber material strips (30 to 36) are broader in their longitudinal center portion (38) than in their end portions (40).

9. Support element according to claim 2, wherein the fiber material strips (50, 52, 54, 56) at the underside (22) of the support element (12) are broader than the fiber material strips located above them which become narrower from layer to layer.

10. Support element according to claim 2, wherein the reaction mixture is a thermosetting resin.

11. Support element according to claim 10, wherein fillers are added to the reaction mixture.

12. Process for the production of the combination of claim 1, wherein the spring-elastic support element (12) is produced by using woven fiber material, wherein a plurality of endless fiber material strips (112, 114, 116, 118) are joined, impregnated with a reaction mixture (122) and then guided through a nozzle (128), in that the multi-layered impregnated fiber material core strand (126) formed in this way is then wound with additional fiber material strands (140, 142) in a carrousel installation (130) and the finished strand (144) formed in this way is fed through another nozzle (146) to a hot press station (150) in which the finished fiber material strand (144) is bent in its longitudinal direction and shaped in cross section, cured and then cut to the length required for the support element (12), said support element being fastened to said wiper strip.

* * * * *